Patented Apr. 19, 1927.

1,625,532

UNITED STATES PATENT OFFICE.

HERMANN FRITZSCHE, EDUARD KRUMMENACHER, HANS GUBLER, AND OTTO KAISER, OF BASEL, SWITZERLAND, ASSIGNORS TO SOCIETY OF CHEMICAL INDUSTRY IN BASLE, OF BASEL, SWITZERLAND.

PROCESS OF MAKING INTERMEDIATE PRODUCTS FOR THE MANUFACTURE OF AZO DYES.

No Drawing. Application filed July 20, 1923, Serial No. 652,858, and in Switzerland September 7, 1922.

In the applications Serial No. 652,857 of July 20th, 1923, and Serial No. 652,859 of July 20th, 1923, there have been described intermediate products of the general formula:

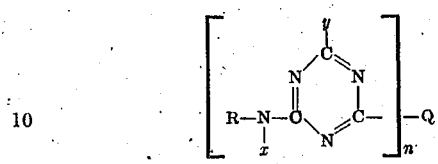

wherein R means an aromatic complex which contains one of a group of auxochromes including

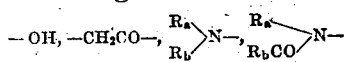

(wherein $R_a$ and $R_b$ represent the same or different alkyl, aryl or aralkyl radicals or hydrogen atoms), $x$ a hydrogen atom or an alkyl, aralkyl or aryl residue, one of the two residues R and $x$ containing at least one strong acid group, Q a hydrogen atom or a radical which is linked to the carbon atom of the cyanuric complex by one of a group of connecting links which contains —O— and —N—, $y$ a halogen or a hydrogen atom or a radical, the hydrogen and the radical being linked to the carbon atom of the cyanuric nucleus by one linking, such as —N— or —O—, and $n$ a whole number not higher than the number of the mobile hydrogen atoms originally present in the molecule corresponding with Q.

It has been found that some of these intermediate products, where Q represents a radical which does not carry one of a group of auxochromes including

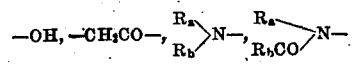

(wherein $R_a$ and $R_b$ represent the same or different alkyl, aryl or aralkyl radicals or hydrogen atoms), may also be manufactured as follows:

In a first phase at least one molecular proportion of a cyanuric trihalide is condensed with one molecular proportion of a compound containing a mobile atom of hydrogen which is linked to an oxygen or nitrogen atom, but not carrying besides one of a group of auxochromes including

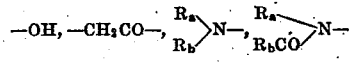

(wherein $R_a$ and $R_b$ represent the same or different alkyl, aryl or aralkyl radicals or a hydrogen atom). Thus are obtained products containing at least one cyanuric nucleus which carries two mobile atoms of halogen. In a second phase any number of those atoms of halogen are then caused to react with compounds carrying mobile atoms of hydrogen, whereby at least one of these compounds should carry the mobile atom of hydrogen which is to react in an amino group, and which contains, besides this amino group, one of a group of auxochromes including

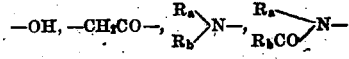

(wherein $R_a$ and $R_b$ represent the same or different alkyl, aryl or aralkyl radicals or a hydrogen atom) and at least one strong acid group, such as a sulfo group or a carboxylic group.

These condensations may be carried out in most cases by stirring successively together the components in a suitable diluent as which water is very appropriate. The course of the reaction may be followed, also in this case, by the quantity of hydrogen halide obtained, by the formation of a precipitate or a clear solution, or by the disappearance of the components.

*Example 1.*

21 parts of sodium 1:3-phenylenediamine-4-sulfonate are dissolved in 300 parts of water. To this solution there are added 14.6 parts of the condensation product from 1 molecular proportion of cyanuric chloride and 2 molecular proportions of ammonia, while the whole is boiled for one hour. The liquid is then cooled, acidified and filtered. The new tertiary condensation product thus formed from 1 molecular proportion of cyanuric chloride, 2 molecular proportions of ammonia and 1 molecular proportion of 1:3-phenylenediamine-4-sulfonic acid forms a crystallized powder dissolving easily in water, with difficulty in alkalies.

*Example 2.*

If for instance a suspension of 18.5 parts of cyanuric chloride in water is treated at 5° with a solution of 19.5 parts of the sodium salt of aniline-4-sulfonic acid, the primary condensation product from one molecular proportion of cyanuric chloride and one molecular proportion of sulfanilic acid precipitates in the form of a crystallized powder. The mixture is then neutralized with a solution of sodium carbonate and treated with a solution of 26.2 parts of sodium 2.5-aminonaphthol-7-sulfonate. While stirring for several hours the secondary condensation product is formed from one molecular proportion of cyanuric chloride, one molecular proportion of sulfanilic acid and 1 molecular proportion of 2.5-aminonaphthol-7-sulfonic acid. By adding common salt the product is thrown out.

This compound corresponding very probably with the formula

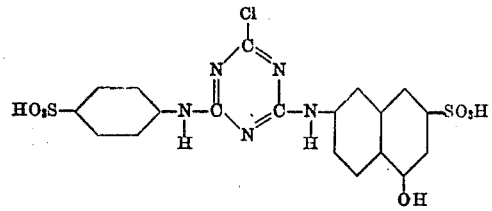

is identical with the one obtained by reaction of sulfanilic acid on the primary condensation product from one molecular proportion of cyanuric chloride and one molecular proportion of 2:5-aminonaphthol-7-sulfonic acid. In this case too the last remaining atom of chlorine may be exchanged by means of water, ammonia, phenol, aromatic amines, etc., for residues of any kind. The compounds thus obtained correspond very probably with the formulæ

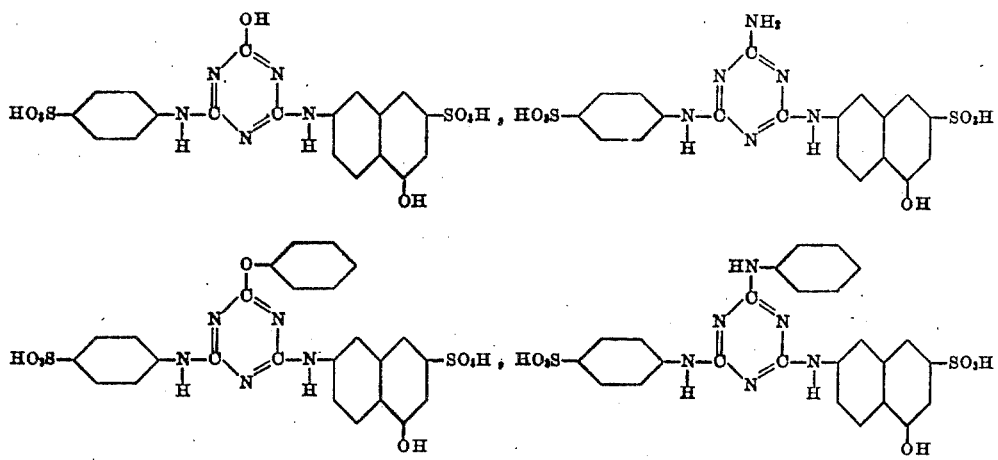

If for instance the solution obtained as described in the first paragraph of this example is heated with one molecular proportion of aniline, there is formed the tertiary condensation product from one molecular proportion of cyanuric chloride, one molecular proportion of 2:5-aminonaphthol-7-sulfonic acid, one molecular proportion of sulfanilic acid and one melocular proportion of aniline. This product is soluble with much greater difficulty than the secondary compound of the first paragraph.

Other secondary condensation products, as for instance, the one from 1 molecular proportion of cyanuric chloride, 1 molecular proportion of sulfanilic acid and one molecular proportion of ammonia, or the condensation product from 1 molecular proportion of cyanuric chloride and 2 molecular proportions of sulfanilic acid react in the same or in a similar way.

*Example 3.*

26.2 parts of sodium 2:5-aminonaphthol-7-sulfonate and 14 parts of crystallized sodium acetate are dissolved in 500 parts of boiling water and treated at this temperature with 14.6 parts of the secondary condensation product, from 2 molecular proportions of ammonia and one molecular proportion of cyanuric chloride. This compound dissolves gradually and the tertiary condensation product thus obtained from one molecular proportion of cyanuric chloride, 2 molecular proportions of ammonia and one molecular proportion of 2:5-aminonaphthol-7-sulfonic acid, thus obtained, separates in form of crystals. It is a greyish white powder dissolving in cold water with difficulty, more easily in hot water, its alkaline solutions do not fluoresce.

The condensation product from 1 molecular proportion of chloro-cyanuricdiamide and 2:7-aminonaphthol, prepared in an analogous manner, and crystallized from acetone, melts at 283–285°, whereas the condensation product from one molecular proportion of chloro-cyanuricdiamide and one molecular proportion of 1:3-phenylenediamine-4-sulfonic acid forms a crystallized powder, easily soluble in alkalies. It corresponds very probably with the formula

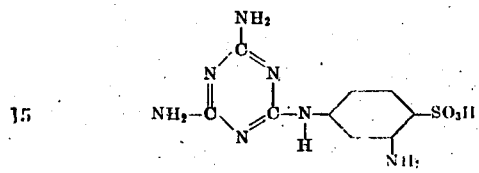

Example 4.

18.5 parts of cyanuric chloride are suspended in 1500 parts of iced water, treated with a solution of 23.2 parts sodium phenolate in 500 parts of water and stirred until the formation of the secondary condensation product from one molecular proportion of cyanuric chloride and 2 molecular proportions of phenol is achieved. 26.1 parts of 2:8-aminonaphthol-6-sulfonic acid are then added, while the whole is stirred for some time in a reflux apparatus at the boiling temperature. The mixture is then cooled and the tertiary condensation product from one molecular proportion of cyanuric chloride, 2 molecular proportions of phenol and 1 molecular proportion of 2:8-aminonaphthol-6-sulfonic acid thus obtained corresponding with the formula

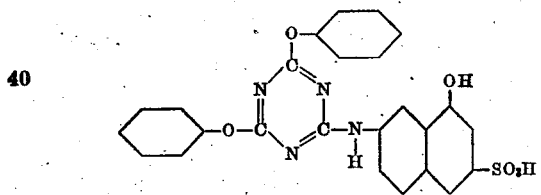

is thrown out with hydrochloric acid. It is a grey powder, easily soluble in a solution of sodium carbonate.

Instead of sodium 2:8-aminonaphthol-6-sulfonate, other neutral salts of the aminonaphthol-sulfonic acids may be condensed in order to produce other tertiary condensation products, as for instance, the salts of the 2:5-aminonaphthol-7-sulfonic acid and those of the 1:8-aminonaphthol-3:6-disulfonic acid. The secondary condensation product from one molecular proportion of cyanuric chloride and 2 molecular proportions of phenol, prepared in this example as intermediate product, melts, if crystallized from alcohol, at 118–120° C.

Example 5.

18.5 parts of cyanuric chloride are suspended in water, treated with 17.4 parts of m-nitraniline hydrochloride and stirred, in the cold, until the m-nitraniline has almost completely disappeared. The crystallized condensation product thus obtained is then filtered, dissolved in acetone and the solution run gradually into a solution of 319 parts of 1:8-aminonaphthol-3:6-disulfonic acid and 106 parts of sodium carbonate in 5000 parts of water. The whole is still stirred until the aminonaphthol sulfonic acid has almost completely disappeared and the condensation product from one molecular proportion of cyanuric chloride, one molecular proportion of m-nitraniline and one molecular proportion of 1:8-aminonaphthol 3:6-disulfonic acid thus formed is thrown out by means of common salt. It corresponds very probably with the formula

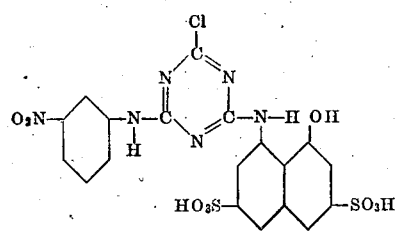

The third atom of chlorine of this product may be exchanged for residues of any kind.

Example 6.

Into a solution of the primary condensation product from 18.5 parts of cyanuric chloride and 20 parts of p-phenylenediamine sulfonic acid there is run a solution of 18.5 parts of cyanuric chloride dissolved in a small quantity of acetone while the whole is stirred until 3.6 parts of hydrochloric acid are freed. The di-primary condensation product thus obtained is filtered. It forms a grey powder and contains still 4 mobile atoms of chlorine.

If the neutral solution of its sodium salt is stirred for some time with 40 parts of p-phenylenediamine sulfonic acid, there is formed the di-secondary condensation product of the general formula:

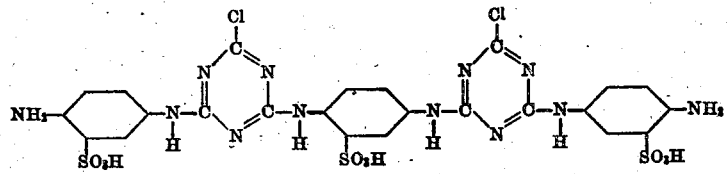

which is isolated by acidifying and addition of common salt.

What we claim is:

The herein described process of making intermediate products of the general formula

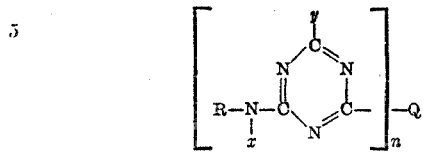

wherein R means an aromatic complex which contains one of a group of auxochromes including

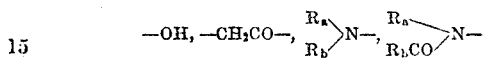

(wherein $R_a$ and $R_b$ represent the same or different alkyl, aryl or aralkyl radicals or hydrogen atoms), $x$ a hydrogen atom or an alkyl, aralkyl or aryl residue, one of the two residues R and $x$ containing at least one strong acid group, Q a hydrogen atom or a radical which is linked to the carbon atom of the cyanuric complex by one of a group of connecting links which contains —O— or —N—, $y$ a halogen or a hydrogen atom or a radical, the hydrogen and the radical being linked to the carbon atom of the cyanuric nucleus by one linking, such as —N— or —O—, and $n$ a whole number not higher than the number of the mobile hydrogen atoms originally present in the molecule corresponding with Q, which consists in condensing, in a first phase, at least one molecular proportion of a cyanuric trihalide with one molecular proportion of a compound containing a mobile atom of hydrogen which is linked to an oxygen or a nitrogen atom, but not carrying besides one of a group of auxochromes including

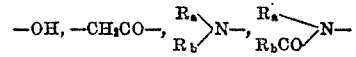

(wherein $R_a$ and $R_b$ represent the same or different alkyl, aryl or aralkyl radicals or a hydrogen atom), then causing to react, in a second phase, any number of the atoms of halogen belonging to the products obtained in the first phase with compounds carrying mobile atoms of hydrogen which are linked to oxygen or nitrogen atoms, whereby at least one of the compounds which are employed in the second phase, firstly, contains the mobile hydrogen atom linked to a nitrogen atom, secondly, contains still one of a group of auxochromes including

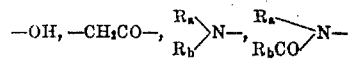

(wherein $R_a$ and $R_b$ represent the same or different alkyl, aryl or aralkyl radicals or hydrogen atoms), thirdly, contains a strong acid group, one phase at least being carried out in water.

In witness whereof we have hereunto signed our names this 6th day of July 1923.

HERMANN FRITZSCHE.
EDUARD KRUMMENACHER.
HANS GUBLER.
OTTO KAISER.